H. C. STRACK.
ROTARY ENGINE.
APPLICATION FILED MAY 25, 1915.

1,169,884.

Patented Feb. 1, 1916.
3 SHEETS—SHEET 1.

Witnesses:
Anna R. Fenton
Chas. Schneider

Inventor
Henry C. Strack
By Dyer & Taylor
Attorneys.

H. C. STRACK.
ROTARY ENGINE.
APPLICATION FILED MAY 25, 1915.
1,169,884.
Patented Feb. 1, 1916.
3 SHEETS—SHEET 2.
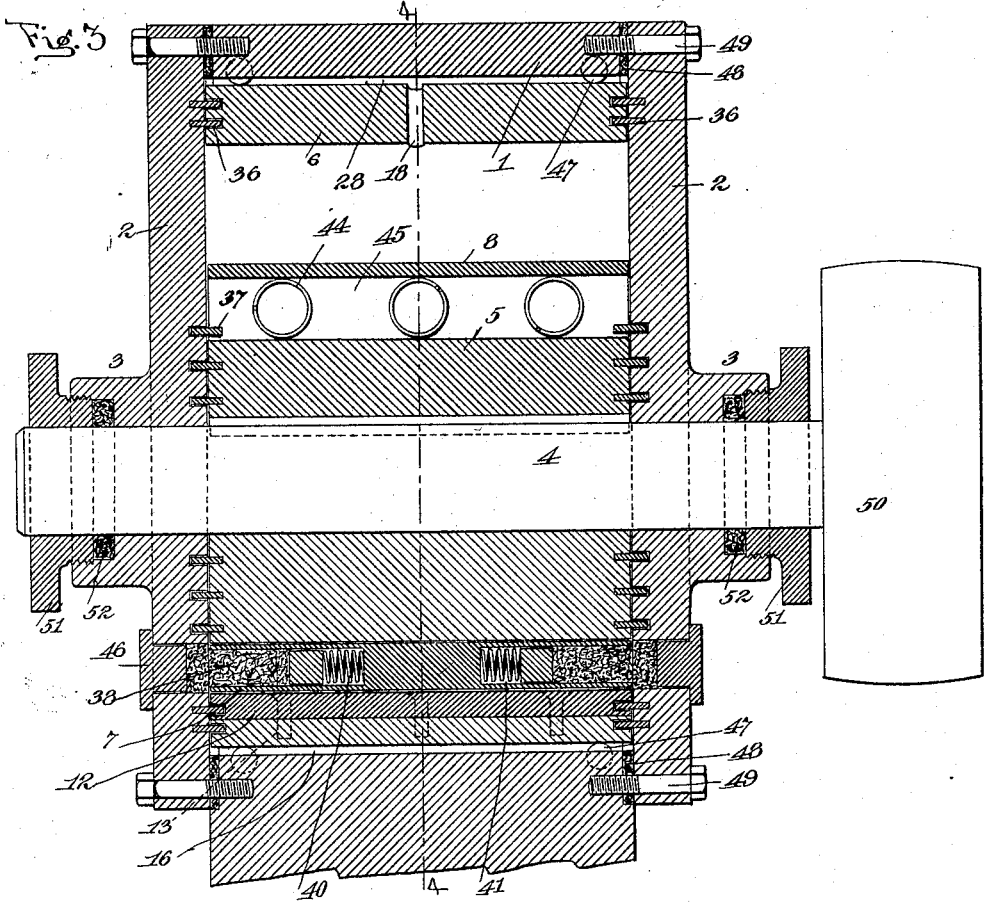
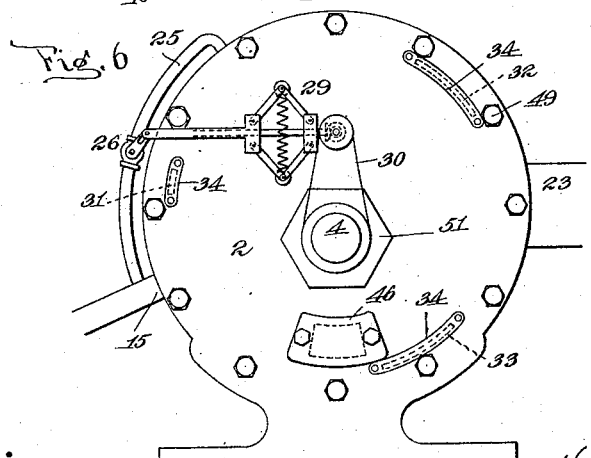
Witnesses:
Anna W. Penton.
Chas. Schneider.
Inventor
Henry C. Strack
By Dyer & Taylor
Attorneys.

H. C. STRACK.
ROTARY ENGINE.
APPLICATION FILED MAY 25, 1915.
1,169,884.
Patented Feb. 1, 1916.
3 SHEETS—SHEET 3.
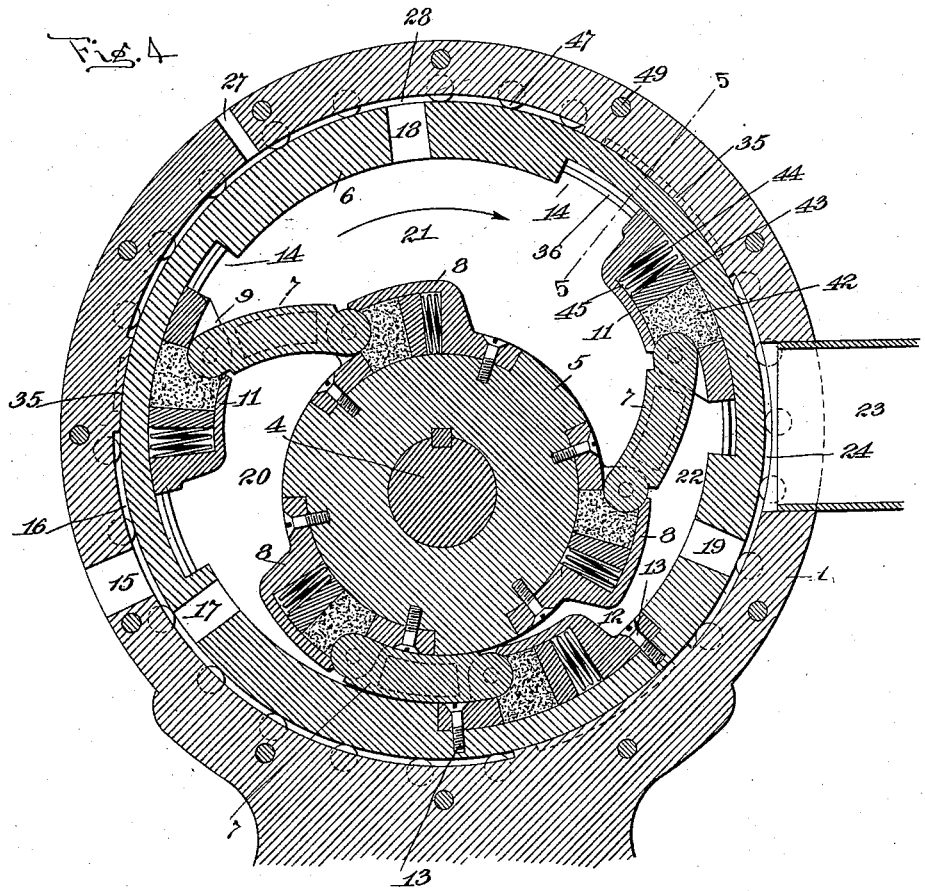
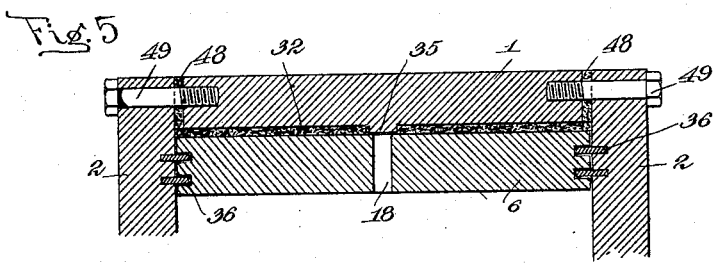
Witnesses:
Inventor
Henry C. Strack
By Dyer & Taylor
Attorneys.

UNITED STATES PATENT OFFICE.

HENRY C. STRACK, OF OWEGO, NEW YORK.

ROTARY ENGINE.

1,169,884.   Specification of Letters Patent.   Patented Feb. 1, 1916.

Application filed May 25, 1915.   Serial No. 30,432.

*To all whom it may concern:*

Be it known that I, HENRY C. STRACK, a citizen of the United States, resident of Owego, Tioga county, State of New York, have invented a certain new and useful Rotary Engine, of which the following is a specification.

This invention relates to improvements in engines employing steam, compressed air, gas or other elastic motive fluid.

The objects of the invention are: First, to secure a uniform rotative movement of the rotor without dead points, *i. e.* to obtain continuous torque. Second, to provide for a very complete expansion of the elastic fluid. Third, to provide for the introduction of auxiliary fluid for starting or for heavy loads. Fourth, to provide for the automatic introduction of this auxiliary fluid.
Fifth, to improve the packing of the moving parts. Sixth, to render the packing accessible. Seventh, to reduce friction.

These and further objects will more fully appear from the following specification and accompanying drawings, considered together or separately.

Figure 1:
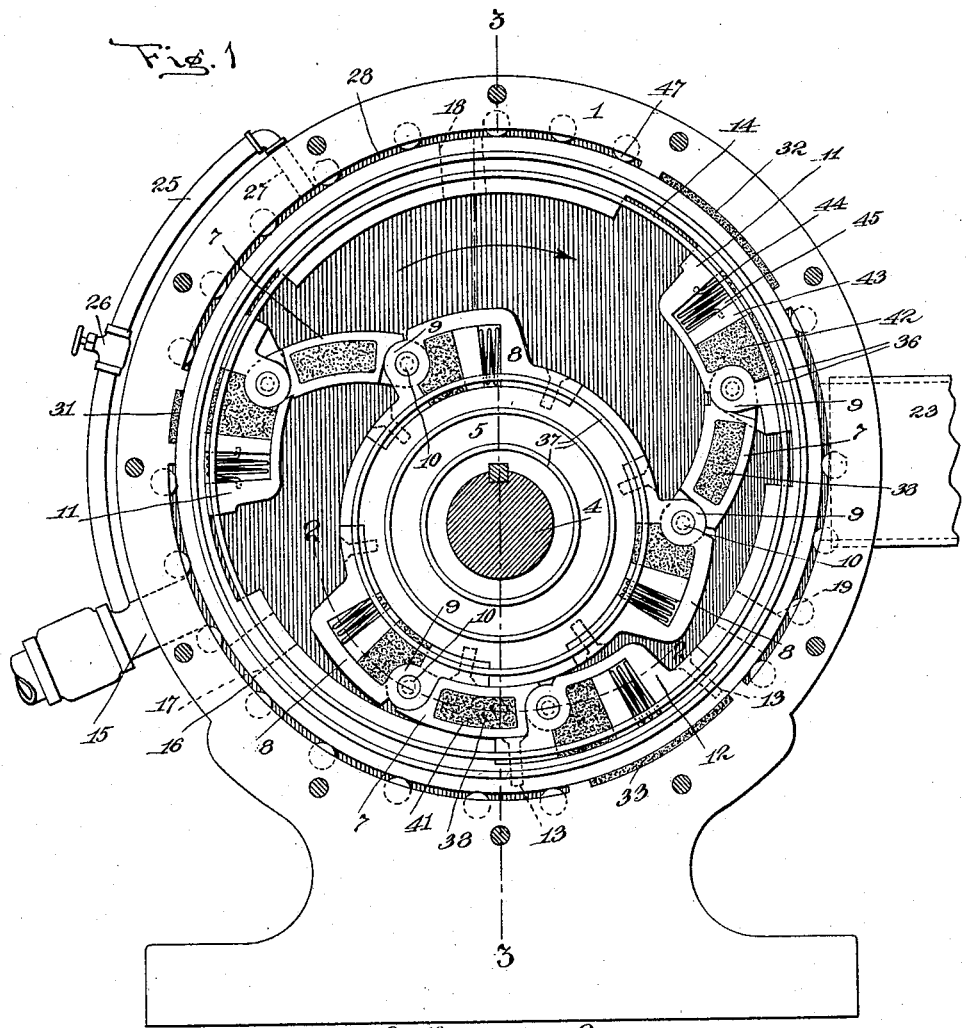
Figure 2:
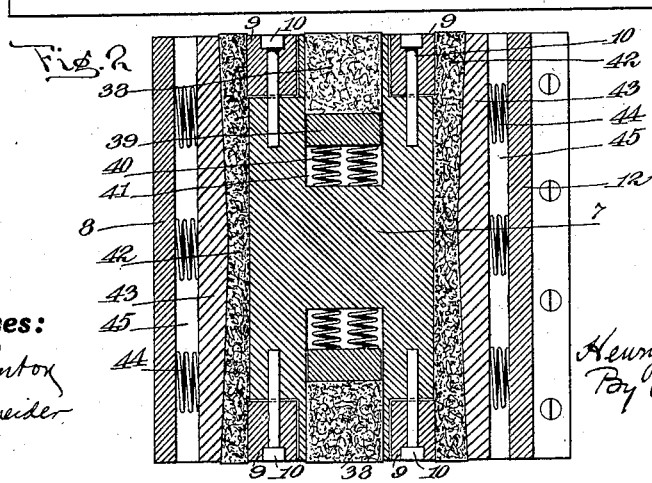

In the drawings, Figure 1 is a side view of an engine embodying my invention and with one of the heads removed; Fig. 2 is a developed section on the line 2, 2 of Fig. 1; Fig. 3 is a section on the line 3, 3 of Fig. 1; Fig. 4 is a section on the line 4, 4 of Fig. 3; Fig. 5 is a section on the line 5, 5 of Fig. 4; and Fig. 6 is a side view of the complete engine shown in Fig. 1, but with the head and plates.

In all views like parts are designated by the same reference characters, considered together or separately.

The engine forming the embodiment chosen for illustration has a frame which comprises a casing 1 and heads 2, 2. The inside of the casing is cylindrical. Each head carries a bearing 3, 3. In these bearings is mounted a shaft 4. On the shaft 4 is a hub 5. The shaft 4 and hub 5 are arranged off the center of the casing. In other words, they are eccentric to the center thereof. Inside of the casing and concentric therewith is a cylinder 6. This cylinder makes a close fit with the heads 2, 2 but with a loose fit between it and the inside of the casing.

Between the cylinder and hub are pistons
7. In the embodiment chosen for illustration these are three in number. Each piston is hinged at one end to the hub and the other end to the cylinder. They are preferably grouped an equal distance apart. The ends of the pistons which are secured to the hub are connected through the agency of frames 8, 8. These frames are attached to the hub by any suitable means such as the screw bolts illustrated. Suitable means for attaching each of the pistons to the frame are shown in Fig. 2. Each frame is provided with ears 9, 9. These ears have openings through which pins 10, 10 pass, such pins entering openings or bearings in the pistons, thus forming a variety of hinged joint, permitting the pistons to swing toward and away from the hubs. The other end of each of the pistons is secured to the cylinder by frames 11, 11 and 12. Two of these frames, designated by the character 11, are alike. The other frame 12, differs from the frames 11, 11. The frame 12 is secured to the cylinder so that it rotates therewith. Suitable means may be used for this purpose, such as screw bolts 13. The frames 11, 11 slide in relation to the cylinder and for this purpose they are mounted within recesses 14, 14 therein.

It is apparent that the cylinder, being free to rotate, will, when rotating, also rotate the hub 5 and owing to the fact that the center of the cylinder is eccentric to the center of the hub, the pistons will move toward and away from the hub during each revolution. The elastic fluid, which may be steam, compressed air, gas or other substance, is admitted through an entrance 15. This entrance communicates with a steam chamber 16. This chamber 16, in the embodiment chosen for illustration, extends a distance of about 90 degrees of the perimeter of the cylinder. Steam is admitted from the chamber 16 to the interior of the cylinder through ports 17, 18 and 19. These ports are preferably equi-distant apart, one port lying between each two pistons. The steam spaces communicating with the ports 17, 18 and 19 are designated by the characters 20, 21 and 22 respectively. The exhaust steam escapes through a pipe or passage 23. In advance of the exhaust is a steam chamber 24. This chamber occupies a smaller peripheral space than the chamber 16. It is apparent that the steam being admitted through the entrance 15 will enter the chamber 16 and from thence will traverse the port 17 and enter the steam space 20. The steam will act upon the piston and expanding will push the latter in the direction of the arrow, see Fig. 4, rotating the shaft 4. As the steam expands and increases in volume in the space 20, it will exert pressure upon the piston 7 in advance of such space and will rotate the shaft. This expansion of the steam will continue until the port 17 passes beyond the end of the steam chamber 16. No more steam will then be admitted to the space 20, but the expansion thereof will still exert a pushing effect upon the piston 7 and this will continue until the port 17 gets into communication with the steam chamber 24, whereupon the steam will escape through the exhaust 23. As the ports 19 and 18 successively come into communication with the chamber 16, steam will enter the space with which each port communicates and will exert a rotative effect upon the piston therein.

For the purpose of securing a greater rotative effect, when desired, an auxiliary steam passage 25 may be employed, see Fig. 6. This passage may be provided with a valve 26. The passage communicates with an auxiliary steam inlet 27 and this inlet communicates with an auxiliary steam chamber 28. This chamber extends from a point adjacent to the end of the chamber 16 to some point in advance of the beginning of the chamber 24. Steam being admitted into this chamber will pass through either of the ports 17, 18 and 19 and the same will come into communication with the chamber and will admit steam into such chamber. If desired, the valve 26 may be connected to a governor 29 operated by any suitable means, such as a belt 30 from the shaft 4. When the speed of the engine exceeds a certain amount the valve 26 will be partially or wholly closed and the auxiliary steam will be reduced or shut off. The steam chambers 16, 24 and 28 are preferably located within the casing 1 as illustrated, as I consider this the most desirable arrangement.

In order to prevent leakage of steam between the relatively moving surfaces, suitable packing devices are provided. Packing 31 is introduced between the chambers 16 and 28. This packing lies within a groove or notch in the casing 1 and engages with the periphery of the cylinder 6. To prevent leakage between the chambers 24 and 28, packing 32 of the same character is provided. To prevent leakage between the chambers 16 and 24, packing 33 is employed. This packing may be reached for replacement or repair by having openings located coincident with the notches in the casing made at one or both of the heads 2, 2. These openings may be covered with removable plates 34. see Fig. 6. In order to prevent the packing from entering the ports 17, 18 and 19, the former is made in the form of two sheets, see Fig. 5, and there is a rib 35 between each sheet of packing extending into the space occupied by the packing and extending closely to the periphery of the cylinder.

For the purpose of preventing leakage beyond the sides of the cylinder, baffling rings 36 are employed. These baffling rings, as shown in Fig. 3, are carried by the heads 2, 2 and enter annular grooves formed in the ends of the cylinder. These rings also serve as supports for the frames 11, 11 see Fig. 4. They hold the frames within the recesses 14 and yet at the same time permit them to slide from one end to the other of the recesses which is necessary to accommodate the position of the pistons due to the rotation of the shaft. To prevent leakage between the hub and the heads 2, 2 baffling rings 37 are provided. These baffling rings may be made similar to the rings 36, or they may be made as illustrated in Fig. 3, in which they are carried by the hub and pass through annular grooves in the inner faces of the heads 2, 2.

For the purpose of preventing leakage of steam around the ends of the pistons, packing 38 is introduced in the ends of each piston. This packing, as shown in Fig. 2, is held in engagement with the head by means of a follower 39 which is pushed outward by springs 40. The springs, follower and packing lie within cavities 41.

To prevent leakage of steam beyond the ends of the frames 8, 11 and 12, the packing shown in Fig. 2 is employed. This packing 42 is pushed outward by means of a follower 43. These followers are preferably made in the double wedge shape shown so that when pushed against the packing by the springs 44 they push the packing out toward the ends of the cavities 45 in which they lie. For the purpose of adjusting and repairing the packing, openings may be made in the heads 2, 2 which are covered by manhole plates 46, see Figs. 3 and 6.

The heads 2, 2 are best secured to the casing 1 by suitable bolts 49 which hold gaskets 48 in place. The cylinder is secured in place by any suitable means attached to the casing or heads 2, 2. I prefer to use anti-friction bearings 47 for this purpose. The power may be taken off the shaft 4 by any suitable means, such as a pulley 50. To prevent leakage of steam through the bearings 3, 3 I may employ glands 51 holding packing 52 in place.

While I have described herein specifically my invention embodied in a rotary steam engine, it is to be understood that the invention may be embodied in an engine utilizing any other motive fluid.

It is also to be understood that while I have embodied the invention in an engine for generating power, the same apparatus may be used as a compressor or pump, in which instance power will be applied to the shaft.

In the following claims the invention is described as an engine and the motive fluid as steam, but it is to be understood that in such claims such terms are used purely for purposes of illustration.

In accordance with the provisions of the patent statutes, I have described the principle of my invention, together with the apparatus which I now consider to represent the best embodiment thereof; but I desire to have it understood that the apparatus to shown is merely illustrative and that the invention may be carried out in other ways within the scope of the appended claims.

Having now described my invention, what I claim as new and desire to secure by Letters Patent, is:

1. A rotary engine comprising a casing, a cylinder therein, means for supporting the cylinder within the casing to permit the cylinder to rotate, a hub within the cylinder and eccentric thereto, pistons connecting the hub and cylinder and dividing the interior of the cylinder into steam spaces, a steam inlet and a steam outlet to the interior of the casing, a steam chamber between the casing and steam inlet, a steam chamber between the cylinder and casing and in communication with the outlet, and a series of ports through the cylinder, each port communicating with a steam space.

2. A rotary engine comprising a casing, a cylinder therein, means for supporting the cylinder within the casing to permit the cylinder to rotate, a hub within the cylinder and eccentric thereto, pistons connecting the hub and cylinder and dividing the interior of the cylinder into steam spaces, a steam inlet and a steam outlet to the interior of the casing, a steam chamber between the casing and steam inlet, a steam chamber between the cylinder and casing and in communication with the outlet, a series of ports through the cylinder, each port communicating with a steam space, frames connecting the pistons to the cylinder, and frames connecting the pistons to the hub, one of the cylinder frames being fixed in relation to the cylinder and another cylinder frame sliding in relation to the cylinder.

3. A rotary steam engine comprising a casing, a cylinder rotating therein, a hub eccentric to the cylinder, frames carried by the hub, frames carried by the cylinder, and pistons connecting the frames, ears carried by the frames, and pins connecting the ears and pistons so that a hinged joint is produced between each frame and piston.

4. A rotary engine comprising a casing, a cylinder therein, means for supporting the cylinder within the casing to permit the cylinder to rotate, a hub within the cylinder and eccentric thereto, pistons connecting the hub and cylinder and dividing the interior of the cylinder into steam spaces, a steam inlet and a steam outlet to the interior of the casing, a steam chamber between the casing and steam inlet, a steam chamber between the cylinder and casing and in communication with the outlet, a series of ports through the cylinder, each port communicating with a steam space, an auxiliary steam passage through the casing, and an auxiliary steam chamber between the casing and cylinder and communicating with a steam port, said auxiliary steam chamber lying between the steam inlet chamber and the steam outlet chamber.

5. A rotary engine comprising a casing, a cylinder therein, means for supporting the cylinder within the casing to permit the cylinder to rotate, a hub within the cylinder and eccentric thereto, pistons connecting the hub and cylinder, and dividing the interior of the cylinder into steam spaces, a steam inlet and a steam outlet to the interior of the casing, a steam chamber between the casing and steam inlet, a steam chamber between the cylinder and casing and in communication with the outlet, a series of ports through the cylinder, each port communicating with a steam space, an auxiliary steam passage through the casing, an auxiliary steam chamber between the casing and cylinder and communicating with a steam port, said auxiliary steam chamber lying between the steam inlet chamber and the steam outlet chamber, and means for controlling the passage of steam through the auxiliary steam passage.

6. A rotary engine comprising a casing, a cylinder therein, means for supporting the cylinder within the casing to permit the cylinder to rotate, a hub within the cylinder and eccentric thereto, pistons connecting the hub and cylinder, and dividing the interior of the cylinder into steam spaces, a steam inlet and a steam outlet to the interior of the casing, a steam chamber between the casing and steam inlet, a steam chamber between the cylinder and casing and in communication with the outlet, a series of ports through the cylinder, each port communicating with a steam space, an auxiliary steam passage through the casing, an auxiliary steam chamber between the casing and cylinder and communicating with a steam port, said auxiliary steam chamber lying between the steam inlet chamber and the steam outlet chamber, a valve in the auxiliary steam passage, a governor driven to turn in time with the hub, and connections between the governor and the valve for changing the position of the latter as depends upon the speed of the hub.

7. A rotary engine comprising a casing, a cylinder therein, means for supporting the cylinder within the casing to permit the cylinder to rotate, a hub within the cylinder and eccentric thereto, pistons connecting the hub and cylinder and dividing the interior of the cylinder into steam spaces, a steam inlet and a steam outlet to the interior of the casing, a steam chamber between the casing and steam inlet, a steam chamber between the cylinder and casing and in communication with the outlet, a series of ports through the cylinder, each port communicating with a steam space, and packing between the cylinder and casing, said packing being located between the steam chambers.

8. A rotary engine comprising a casing, a cylinder therein, means for supporting the cylinder within the casing to permit the cylinder to rotate, a hub within the cylinder and eccentric thereto, pistons connecting the hub and cylinder and dividing the interior of the cylinder into steam spaces, a steam inlet and a steam outlet to the interior of the casing, a steam chamber between the casing and steam inlet, a steam chamber between the cylinder and casing and in communication with the outlet, a series of ports through the cylinder, each port communicating with a steam space, packing between the cylinder and casing, said packing being located between the steam chambers, said packing being arranged in sheets separated by an interval substantially as wide as a steam port, and a rib lying in the space between the steam packing and carried by the casing.

9. A rotary engine comprising a casing, a cylinder therein, means for supporting the cylinder within the casing to permit the cylinder to rotate, a hub within the cylinder and eccentric thereto, pistons connecting the hub and cylinder and dividing the interior of the cylinder into steam spaces, a steam inlet and a steam outlet to the interior of the casing, a steam chamber between the casing and steam inlet, a steam chamber between the cylinder and casing and in communication with the outlet, a series of ports through the cylinder, each port communicating with a steam space, packing between the cylinder and casing, said packing being located between the steam chamber, said packing being arranged in sheets separated by an interval substantially as wide as a steam port, a rib lying in the space between the steam packing and carried by the casing, heads connecting and inclosing the sides of the casing, openings within the heads adjacent to the packing, and removable plates covering the openings.

10. A rotary engine comprising a casing, a cylinder therein, means for supporting the cylinder within the casing to permit the cylinder to rotate, a hub within the cylinder and eccentric thereto, pistons connecting the hub and cylinder and dividing the interior of the cylinder into steam spaces, a steam inlet and a steam outlet to the interior of the casing, a steam chamber between the cylinder and casing and in communication with the outlet, a series of ports through the cylinder, each port communicating with a steam space, heads inclosing the sides of the casing, and packing rings located between the heads and the sides of the cylinder to prevent leakage between the steam spaces and steam chambers.

11. A rotary engine comprising a casing, a cylinder therein, means for supporting the cylinder within the casing to permit the cylinder to rotate, a hub within the cylinder and eccentric thereto, pistons connecting the hub and cylinder and dividing the interior of the cylinder into steam spaces, a steam inlet and a steam outlet to the cylinder of the casing, a steam chamber between the casing and steam inlet, a steam chamber between the cylinder and casing and in communication with the outlet, a series of ports through the cylinder, each port communicating with a steam space, frames connecting the pistons to the cylinder, frames connecting the pistons to the hub, one of the cylinder frames being fixed in relation to the cylinder and another cylinder frame sliding in relation to the cylinder, heads inclosing the sides of the casing, there being recesses within the cylinder in which the cylinder frames slide, and packing rings between the cylinder and heads, said rings engaging with the frames and holding them in position within the recesses.

12. A rotary engine comprising a casing, a cylinder therein, means for supporting the cylinder within the casing to permit the cylinder to rotate, a hub within the cylinder and eccentric thereto, pistons connecting the hub and cylinder and dividing the interior of the cylinder into steam spaces, a steam inlet and a steam outlet to the interior of the casing, a steam chamber between the cylinder and casing and in communication with the outlet, a series of ports through the cylinder, each port communicating with a steam space, heads inclosing the sides of the casing, packing rings located between the heads and the sides of the cylinder to prevent leakage between the steam spaces and steam chambers, and additional packing rings between the heads and the hubs to prevent leakage at the joint.

13. A rotary engine comprising a casing, a cylinder therein, means for supporting the cylinder within the casing to permit the cylinder to rotate, a hub within the cylinder and eccentric thereto, pistons connecting the hub and cylinder, and dividing the interior of the cylinder into steam spaces, a steam inlet and a steam outlet to the interior of the casing, a steam chamber between the casing and steam inlet, a steam chamber between the cylinder and casing and in communication with the outlet, a series of ports through the cylinder, each port communicating with a steam space, heads inclosing the sides of the steam chamber, packing carried by the pistons and engaging with the heads, said packing lying within recesses in the pistons, followers within the recesses, and springs engaging with the followers and forcing the packing into engagement with the heads.

14. A rotary engine comprising a casing, a cylinder therein, means for supporting the cylinder within the casing to permit the cylinder to rotate, a hub within the cylinder and eccentric thereto, pistons connecting the hub and cylinder and dividing the interior of the cylinder into steam spaces, a steam inlet and a steam outlet to the interior of the casing, a steam chamber between the casing and steam inlet, a steam chamber between the cylinder and casing and in communication with the outlet, a series of ports through the cylinder, each port communicating with a steam space, heads inclosing the sides of the casing, frames connecting the pistons to the cylinder, frames connecting the pistons to the hub, packing between the frames and pistons, said packing engaging with the pistons and with the heads, followers engaging with the packing, said followers being wedge shaped to force the packing outward against the heads, and springs for moving the followers.

15. A rotary engine comprising a casing, a cylinder therein, means for supporting the cylinder within the casing to permit the cylinder to rotate, a hub within the cylinder and eccentric thereto, pistons connecting the hub and cylinder and dividing the interior of the cylinder into steam spaces, a steam inlet and a steam outlet to the interior of the casing, a steam chamber between the casing and steam inlet, a steam chamber between the cylinder and casing and in communication with the outlet, a series of ports through the cylinder, each port communicating with a steam space, heads inclosing the sides of the casing, frames connecting the pistons to the cylinder, frames connecting the pistons to the hub, packing between the frames and pistons, said packing engaging with the pistons and with the heads, followers engaging with the packing, said followers being wedge shaped to force the packing outward against the heads, springs moving the followers, packing carried by the pistons, followers engaging the packing and forcing it against the heads, and springs for moving the followers.

16. A rotary engine comprising a casing, a cylinder therein, means for supporting the cylinder within the casing to permit the cylinder to rotate, a hub within the cylinder and eccentric thereto, pistons connecting the hub and cylinder and dividing the interior of the cylinder into steam spaces, a steam inlet and a steam outlet to the interior of the casing, a steam chamber between the casing and steam inlet, a steam chamber between the cylinder and casing and in communication with the outlet, a series of ports through the cylinder, each port communicating with a steam space, heads inclosing the pistons to the casing, frames connecting the pistons to the cylinder, frames connecting the pistons to the hub, packing between the frames and pistons, said packing engaging with the pistons and with the heads, followers engaging with the packing, said followers being wedge shaped to force the packing outward against the heads, springs moving the followers, packing carried by the pistons, followers engaging the packing and forcing it against the heads and springs for moving the followers, openings in the heads adjacent to the packing, and plates inclosing the openings.

17. A rotary engine comprising a casing, a cylinder therein, means for supporting the cylinder within the casing to permit the cylinder to rotate, a hub within the cylinder and eccentric thereto, pistons connecting the hub and cylinder and dividing the interior of the cylinder into steam spaces, a steam inlet and a steam outlet to the interior of the casing, a steam chamber between the casing and steam inlet, a steam chamber between the cylinder and casing and in communication with the outlet, a series of ports through the cylinder, each port communicating with a steam space, and anti-friction bearings between the casing and cylinder.

This specification signed and witnessed this 21st day of May, 1915.

HENRY C. STRACK.

Witnesses:
ALBERT S. ANDREWS,
R. D. STEELE.

Copies of this patent may be obtained for five cents each, by addressing the "Commissioner of Patents Washington, D. C."